United States Patent
Jay et al.

(10) Patent No.: US 9,777,690 B2
(45) Date of Patent: Oct. 3, 2017

(54) FUEL SYSTEM FOR AN INTERNAL COMBUSTION PISTON ENGINE AND A METHOD OF OPERATING AN INTERNAL COMBUSTION ENGINE

(71) Applicant: Wärtsilä Finland Oy, Vassa (FI)

(72) Inventors: David C Jay, Vaasa (FI); Timo Kortet, Vassa (FI)

(73) Assignee: Wärtsilä Finland Oy (FI)

( * ) Notice: Subject to any disclaimer, the term of this patent is extended or adjusted under 35 U.S.C. 154(b) by 98 days.

(21) Appl. No.: 14/824,530

(22) Filed: Aug. 12, 2015

(65) Prior Publication Data

US 2016/0047347 A1   Feb. 18, 2016

(30) Foreign Application Priority Data

Aug. 15, 2014  (EP) ..................................... 14181130

(51) Int. Cl.
*F02D 19/06* (2006.01)
*F02M 21/02* (2006.01)
(Continued)

(52) U.S. Cl.
CPC .............. *F02M 67/02* (2013.01); *C10L 3/10* (2013.01); *C10L 3/12* (2013.01); *F02D 19/0647* (2013.01);
(Continued)

(58) Field of Classification Search
CPC ........ F02M 67/02; F02M 59/00; F02M 61/04; F02M 63/0015; F02M 63/0225; F02M 63/0265; F02M 37/0011; F02M 37/0052; F02M 37/0082; F02M 21/08;
(Continued)

(56) References Cited

U.S. PATENT DOCUMENTS

| 5,377,645 A | * | 1/1995 | Moore | ..................... F02B 43/00 |
| | | | | 123/478 |
| 5,664,532 A | * | 9/1997 | August | ................... F02M 59/42 |
| | | | | 123/179.11 |

(Continued)

FOREIGN PATENT DOCUMENTS

| DE | 102008024561 A1 | 11/2009 |
| EP | 2341234 A2 | 7/2001 |

(Continued)

OTHER PUBLICATIONS

European Search report dated Dec. 22, 2014, completed on Dec. 15, 2014, for corresponding European application No. EP 14181130.

(Continued)

*Primary Examiner* — Lindsay Low
*Assistant Examiner* — George Jin
(74) *Attorney, Agent, or Firm* — Heslin Rothenberg Farley & Mesiti, P.C.; Victor Cardona, Esq.

(57) ABSTRACT

A fuel system for an internal combustion piston engine includes a first fuel section and a second fuel section in which the first fuel section has a first inlet line connecting respective inlets of the injectors to a tank, and the second fuel section has a second inlet line connecting respective inlets of the injectors to a fuel tank. The second fuel section is arranged to inject the fuel into the combustion chambers for igniting the first fuel, in which first fuel section the inlet line extends from a high pressure pump to the respective injectors, and a fuel return line of the first fuel section extends from each of the injectors to the tank. The fuel return line has a pressure increasing means arranged to the fuel return line of the first fuel section between the injectors and the tank.

16 Claims, 4 Drawing Sheets

(51) Int. Cl.
| | | |
|---|---|---|
| *F02M 67/02* | (2006.01) | |
| *F02D 19/10* | (2006.01) | |
| *F02M 37/00* | (2006.01) | |
| *F02M 59/00* | (2006.01) | |
| *F02M 61/04* | (2006.01) | |
| *F02M 63/00* | (2006.01) | |
| *C10L 3/10* | (2006.01) | |
| *C10L 3/12* | (2006.01) | |

(52) U.S. Cl.
CPC ......... *F02D 19/0684* (2013.01); *F02D 19/10* (2013.01); *F02M 21/0239* (2013.01); *F02M 37/0011* (2013.01); *F02M 37/0052* (2013.01); *F02M 37/0082* (2013.01); *F02M 59/00* (2013.01); *F02M 61/04* (2013.01); *F02M 63/0015* (2013.01); *Y02T 10/32* (2013.01); *Y02T 10/36* (2013.01)

(58) Field of Classification Search
CPC ........... F02M 21/0287; F02M 21/0233; F02M 21/023; F02M 21/02; F02M 21/0212; F02M 21/0215; F02M 21/0218; F02M 21/0227; F02D 19/0647; F02D 19/0684; F02D 19/10; F02D 19/0613; F02D 19/0692; F02D 19/08; C10L 3/10; C10L 3/12; C10L 3/101
USPC ....................................................... 123/514
See application file for complete search history.

(56) References Cited

U.S. PATENT DOCUMENTS

| | | | | |
|---|---|---|---|---|
| 2002/0189589 | A1* | 12/2002 | Kato | ...................... F02M 21/08 123/458 |
| 2011/0155102 | A1* | 6/2011 | Ten Broeke | ........ F02D 19/0605 123/446 |
| 2012/0097273 | A1* | 4/2012 | Uryu | ................... F02D 41/3082 137/565.3 |
| 2013/0118452 | A1* | 5/2013 | Yoon | .................. F02M 21/0212 123/456 |
| 2013/0146246 | A1* | 6/2013 | Kim | ....................... F02M 31/20 165/41 |
| 2013/0311067 | A1* | 11/2013 | Stockner | ............... F02D 19/027 701/104 |
| 2014/0109866 | A1* | 4/2014 | Gruber | ............... F02M 21/0215 123/262 |
| 2014/0123947 | A1* | 5/2014 | Song | ..................... F02M 39/00 123/446 |
| 2014/0245995 | A1* | 9/2014 | Deliyski | ................ F02M 69/50 123/456 |
| 2014/0318503 | A1* | 10/2014 | Kang | ................ F02M 37/0052 123/506 |

FOREIGN PATENT DOCUMENTS

| | | |
|---|---|---|
| WO | 2004/097196 A1 | 11/2004 |
| WO | 2008/065238 A1 | 6/2008 |
| WO | 2013/115645 A1 | 8/2013 |
| WO | 2013/127526 A1 | 9/2013 |
| WO | 2014/173599 A2 | 10/2014 |

OTHER PUBLICATIONS

Partial European Search report dated Oct. 23, 2014, completed on Oct. 16, 2014, for corresponding European application No. EP 14181130.

* cited by examiner

FUEL SYSTEM FOR AN INTERNAL COMBUSTION PISTON ENGINE AND A METHOD OF OPERATING AN INTERNAL COMBUSTION ENGINE

CROSS-REFERENCE TO RELATED APPLICATIONS

This application claims priority to European patent application No. 14181130.7, filed on Aug. 15, 2014, the entire disclosure of which is incorporated herein by reference.

TECHNICAL FIELD

Invention relates to a fuel system for an internal combustion piston engine comprising a first fuel section and a second fuel section in which the first fuel section comprises an first inlet line connecting respective inlets of the injectors to a tank, and the second fuel section comprises a second inlet line connecting respective inlets of the injectors to a fuel tank, the second fuel section being arranged to inject the fuel into the combustion chambers for igniting the first fuel, in which first fuel section the inlet line extends from a high pressure pump to the respective injectors, and a fuel return line of the first fuel section extends from each of the injectors to the tank.

The present invention relates to a method of operating an internal combustion engine provided with a first fuel section via which a first fuel is fed to the engine in liquid form and a second fuel section via which a second fuel is fed to the engine in liquid form.

Invention relates also to processing raw gas at a well site and utilizing the same for energy production purposes.

BACKGROUND ART

Internal combustion piston engines are widely used making use of various liquid and gaseous fuels. The variety of fuels has an increasing tendency at least partly due to the diminishing resources of petroleum.

Naturally the fuel which is used in an internal combustion piston engine sets technical requirements to the fuel section in order to operate as desired. Following publications are cited as examples of different fuel sections in connection with an internal combustion engines.

WO2013127526 A1 discloses a power plant include an internal combustion engine adapted to be operated with pyrolysis oil based fuels. The power plant may allow switching fuels while continuously operating internal combustion engine and provide for a stop and start-up procedure for operating the internal combustion engine with pyrolysis oil based fuels.

WO2008065238 A1 shows a marine vessel machinery, comprising a fuel feeding system for feeding fuel to the at least two combustion units, a separate first fuel tank for first fuel and a second fuel tank for second fuel. The fuel feeding system is provided with a fuel blending unit connected to the first and the second fuel tanks.

In US2014109866 A1 there is shown an internal combustion engine includes one main combustion chamber for the combustion of a first combustion mixture, one pre-combustion chamber for each respective main combustion chamber for the combustion of a second combustion mixture, a first fuel gas mixer for providing the first combustion mixture, a second fuel gas mixer for providing the second combustion mixture, an air feed line and a synthesis gas feed line, a first mixture line connected to the first fuel gas mixer and the main combustion chamber, and a second mixture line connected to the second fuel gas mixer and the pre-combustion chamber. The first fuel gas mixer is connected to the synthesis gas feed line for the admixing of synthesis gas, and an open or closed loop control device is provided for open or closed loop controlling mixing ratios of fuel, air and synthesis gas in the first combustion mixture and/or second combustion mixture.

Due to many reasons, but particularly because constantly restricting emission requirements, the variety of potentially usable fuels in an internal combustion piston engine has recently increased. So far it has been a common practise that gaseous fuels have been combusted in piston engines in gaseous form even if they would be stored or delivered in liquefied form. This is suitable and convenient for certain gases, such as natural gas, pure propane or liquefied petroleum gas.

However, there is a need to develop a fuel system for and method of operating an internal combustion engine with certain hydrocarbons compounds which would possible be otherwise wasted.

An object of the invention is to provide a fuel system for and method of operating an internal combustion engine by means of which particularly a gas condensate fuel consisting of hydrocarbon with $\geq 3$ carbon atoms may be efficiently combusted.

It is also an object of the invention to provide a method of processing raw gas comprising one or more steps of processing the raw gas in which the performance is considerably improved compared to the prior art solutions.

DISCLOSURE OF THE INVENTION

Object of the invention are met by a fuel system for an internal combustion piston engine comprising a first fuel section and a second fuel section in which the first fuel section comprises an first inlet line connecting respective inlets of the injectors to a tank, and the second fuel section comprises a second inlet line connecting respective inlets of the injectors to a fuel tank, the second fuel section being arranged to inject the fuel into the combustion chambers for igniting the first fuel, in which first fuel section the inlet line extends from a high pressure pump to the respective injectors, and a fuel return line' of the first fuel section extends from each of the injectors to the tank.

It is characteristic to the invention that the fuel return line comprises a pressure increasing means arranged to the fuel return line of the first fuel section between the injectors and the tank.

This makes it possible operate the engine successfully with low viscosity fuel, particularly a gas condensate fuel consisting of hydrocarbon with $\geq 3$ carbon atoms.

According to an embodiment of the invention the pressure increasing means is arranged to maintain a desired fuel pressure in the tank of the first fuel section and the fuel system is provided with a control system adapted to control the operation of the pressure increasing means.

According to an embodiment of the invention the fuel return line comprises a heat transfer means arranged between the injectors and the tank and the fuel system is provided with a control system adapted to control the operation of the heat transfer means.

According to an embodiment of the invention the pressure increasing means is arranged to maintain a desired fuel pressure in the tank of the first fuel section, and that the fuel return line comprises a heat transfer means arranged between the injectors and the tank and the fuel system is provided with a control system adapted to control the operation of the heat transfer means, and the operation of the pressure increasing means and the heat transfer means.

According to an embodiment of the invention the first fuel section and the second fuel section share a common fuel injector assembly with fluidly separated flow channels and equipment for the first and the second fuel sections.

According to an embodiment of the invention the injectors of the first fuel section are provided with dedicated first fuel pressure operated control equipment and the injectors of the first fuel section are provided with dedicated second fuel pressure operated control equipment. The pressure operated control equipment of the separate fuel sections a fluidly separated from each other.

According to an embodiment of the invention the injector assembly is provided with a dedicated pressure accumulator and a flow fuse for the first injector.

According to an embodiment of the invention the accumulator of the second fuel section is at least partially outside the injector assembly using the volume of the inlet line having a section provided with cross sectional extension.

Object of the invention is also met by a method of operating an internal combustion engine provided with a first fuel section via which a first fuel is fed to the engine in liquid form and a second fuel section via which a second fuel is fed to the engine in liquid form, the engine is operated by feeding low viscosity fuel in liquid phase as the first fuel via a first fuel injector of the first fuel section directly to a combustion chamber of the engine and where the low viscosity fuel is ignited by injecting the second fuel as a pilot fuel into the combustion chamber by means of a second fuel injector of the second fuel section. It is characteristic to the invention that a part of the low viscosity fuel is returned back to a tank of the first fuel section and the pressure of the returned part of the low viscosity fuel is increased prior to its introduction into a fuel tank.

According to an embodiment of the invention the part of the low viscosity fuel is returned back to a tank of the first fuel section and heat is transferred into/from the returned part of the low viscosity fuel prior to its introduction into a fuel tank of the first fuel section.

According to an embodiment of the invention the part of the low viscosity fuel is returned back to a tank of the first fuel section and in the method the returned part of the low viscosity fuel is cooled prior to its introduction into a fuel tank of the first fuel section and the pressure of the returned part of the low viscosity fuel is increased prior to its introduction into a fuel tank of the first fuel section. Advantageously the cooling is practiced prior to increasing the pressure also.

According to an embodiment of the invention the method is practised with a fuel having its kinematic viscosity $0.1$-$1.0 \times 10^{-6}$ $m^2/s$.

According to an embodiment of the invention the low viscosity fuel comprises a gas condensate fuel consisting of hydrocarbon with $\geq 3$ carbon atoms in the chain and the method is practised for combusting the gas condensate fuel.

An object of the invention is also met by a method of processing raw gas comprising one or more steps of processing the raw gas resulting a separation of accept flow and liquid reject flow, in which method at least a fraction of the liquid reject flow is used as the low viscosity fuel in the method according anyone of the claims 9-14.

According to an embodiment of the invention the engine is operated to provide power for at least one of the steps of processing the raw gas.

According to an embodiment of the invention the engine is operated to provide power at oil well site.

Before natural gas can be marketed as a standardized fuel, it must be processed to remove impurities, including water, to meet the specification of marketable natural gas. The by-products of this processing include ethane, propane, butanes, pentanes, and higher molecular weight hydrocarbons, hydrogen sulfide, carbon dioxide, water vapour, and sometimes helium and nitrogen. By means of the present invention it is possible to efficiently utilize such gaseous side stream fuels in the process of the preparing marketable natural gas.

Raw natural gas can be "associated" i.e. found in oil fields, or "non-associated" i.e. isolated in natural gas fields, and it is also found in coal beds e.g. as coal bed methane. It sometimes contains a significant amount of ethane, propane, butane, and pentane. Such heavier hydrocarbons are typically removed prior to the methane being sold as a consumer fuel or chemical plant feedstock. By means of the present invention it is possible to efficiently utilize such heavier hydrocarbon fuels in the raw natural gas.

In connection with this application by the term condensate fuel it is meant fuel material comprising hydrocarbon compound having 3 or more parent carbon atoms in the chain. Such condensate fuel in liquid state has very low viscosity, compared to other liquid fuels used in internal combustion engines.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
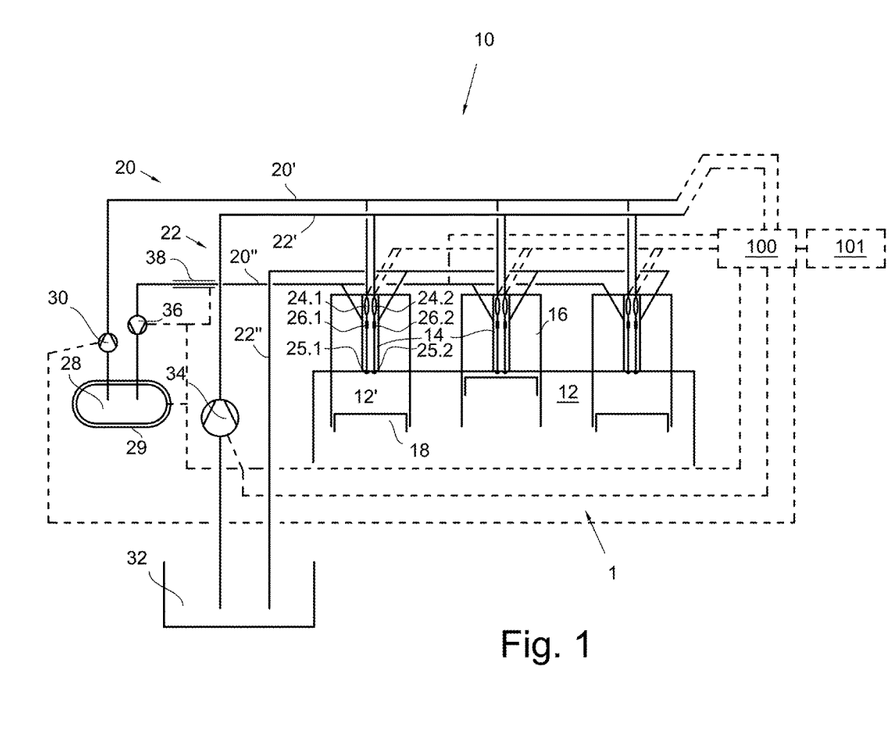
FIG. 1 illustrates an internal combustion piston engine according to an embodiment of the invention.

FIG. 1 depicts schematically an internal combustion piston engine 1 provided with a fuel system 10 according to the invention. The engine comprises a body 12 into which the combustion chambers 12' have been arranged each of which delimited by a cylinder, cylinder head 16 and a piston 18 arranged to the cylinder. Each of the cylinders is provided with a fuel injector assembly 14 arranged in connection with each cylinder head 16.

The engine is provided with a first fuel section 20 and a second fuel section 22. Both of the fuel sections are arranged to handle liquid fuel. The first fuel section 20 is connected to a fuel source, such as a fuel tank 28 from which the fuel is fed to the combustion chambers 12' of the engine 1 via the first fuel section 20. The fuel tank 28 of the first fuel section is advantageously enclosed by a heat insulation arrangement 29. That is because the fuel tank 28 is according to an embodiment of the invention arranged for containing liquid fuel at temperature below zero Celsius degrees and at a pressure above the atmosphere. The second fuel section 22 is respectively connected to a fuel source, such as a fuel tank 32 from which the fuel is fed to the combustion chambers 12' of the engine 1 via the fuel section 22 as a pilot fuel.

The first fuel section 20 comprises an inlet line 20' denoted as the first inlet line connecting respective inlets of the injectors 25.1 to the tank 28 of the first fuel section 20. The inlet line 20' comprises also a high pressure pump 30 arranged to pressurize the fuel into desired pressure for performing the injection of the fuel into the combustion chambers 12' at compressed state. Respectively the second fuel section 22 comprises an inlet line 22' i.e. the second inlet line connecting respective inlets of the injectors 25.2 to the tank 32. The second inlet line 22' comprises also a high pressure pump 34 arranged to pressurize the fuel into desired pressure for performing the injection of the fuel into the combustion chambers 12' for igniting purposes.

The inlet line 20' extends from a high pressure pump 30 to the respective injectors 25.1 of the first fuel section 20 and so the inlet line 20' downstream the high pressure pump 30 belongs to the high pressure part of the first fuel section 20. The first fuel section 20 is provided with a fuel return line 20" which extends from each of the injectors 25.1 to the fuel tank 28. Since the first fuel is advantageously low viscosity condensate gas in liquid phase, part of fuel in the return line may evaporate due to the decreased pressure and temperature effecting on the fuel. According to the invention the evaporated part of the fuel is liquefied at latest by the increased pressure in a pressure increasing means 36 arranged to the fuel return line 20" of the first fuel section 20 between the injectors 25.1 and the tank 28. The pressure increasing means 36 is arranged to maintain a desired fuel pressure in the tank 28.

According to an embodiment of the invention the pressure increasing means is a compressor. According to another embodiment of the invention the pressure increasing means is a pump. In the FIG. 1 there is also shown an optional heat transfer means 38 in connection with the fuel return line which can be used for maintaining the fuel in the intermediate part of the return line in liquid phase. This makes it possible to maintain the low viscosity fuel used in the method according to the present invention is liquid phase also in the return line by controlling the temperature of the fuel in the return line.

Particularly in the case the pressure increasing means is a pump the fuel return line 20" comprises a combination of the pump 36 and the heat transfer means 38. In this case the heat transfer means 38 is a cooler arranged to cool the fuel in the return line prior to its entering the pump 36 i.e. the temperature of the fuel may be decreased before pumping. This in turn causes condensation of possible gas phase in the fuel and the return flow of the fuel is liquid already at the entry of the pump 36.

Depending on the actual structure and the operational principle also the second fuel section 22 may include a fuel return line 22", and in the embodiment of FIG. 1 the fuel return line 22" is arranged to extend from each injector 25.2 to the tank 32. Via the return line any fuel flowing to a low pressure side may be returned to the tank 32.

The fuel system or the engine according to the invention is also provided with a control unit 100 which is arranged to control the operation of the high pressure pumps 30, 34 of the fuel sections as well as the operations of the fuel injectors 25.1, 25.2. The control unit 100 is also arranged to monitor the pressure of the high pressure part of the fuel sections 20, 22. Further, the control unit is arranged to monitor the pressure in tank 28 of the first fuel section 20 by controlling the operation of the pressure increasing means 36 and/or the cooler 38 such that a desired pressure is maintained in the intermediate part of the return line 20". The control unit is provided with an access to a source of information comprising the information of properties of the fuel used in the first fuel section 20. The access to the source of information comprises a reading access to a memory unit 101 where the fuel properties are stored. The memory unit may be internal or external to the control unit 100. The fuel properties comprise particularly information regarding to pressure and temperature where the fuel changes its phase from liquid to gas and/or vice versa. The control unit 100 comprises also instructions to control the operation of the pressure increasing means 36 such that the pressure of the fuel in the tank 28 of the first fuel section is maintained at a level keeping the fuel in liquid form. The control unit 100 comprises instructions to control the operation of the heat transfer means 38 such that the temperature of the fuel in the return line of the first fuel section is maintained at a level keeping the fuel in liquid form.

According to an embodiment of the invention the engine is operated by feeding low viscosity fuel in liquid phase as the first fuel via the first fuel section 20 into the engine 1. The low viscosity fuel is injected directly into the combustion chamber 12 by means of a fuel injector 25.1. And the fuel/air mixture in the combustion chamber is ignited by the second fuel, operating as pilot fuel which is injected into the combustion chamber by means of the second fuel section 22. The low viscosity fuel is maintained in liquid phase at least until it is inside the injector 25.1 and it may evaporate practically immediately after it has been injected into the combustion chamber 12'.

In practise the flow rate of the fuel which is fed to each of the fuel injector is greater than the flow rate injected in the combustion chamber due to the fact that part of the fuel e.g. flows through clearances in the injection equipment to low pressure side and may not be used in injection unless recycled back to the high pressure pump. Therefore part of the low viscosity fuel is returned to the return line 20" and in the method the low viscosity fuel is maintained in liquid phase in a fuel return line 20" of the first fuel section 20. This applies at least to a portion of the first fuel section in the engine or a portion of the first fuel section supported to the engine 1.".

Figure 2:
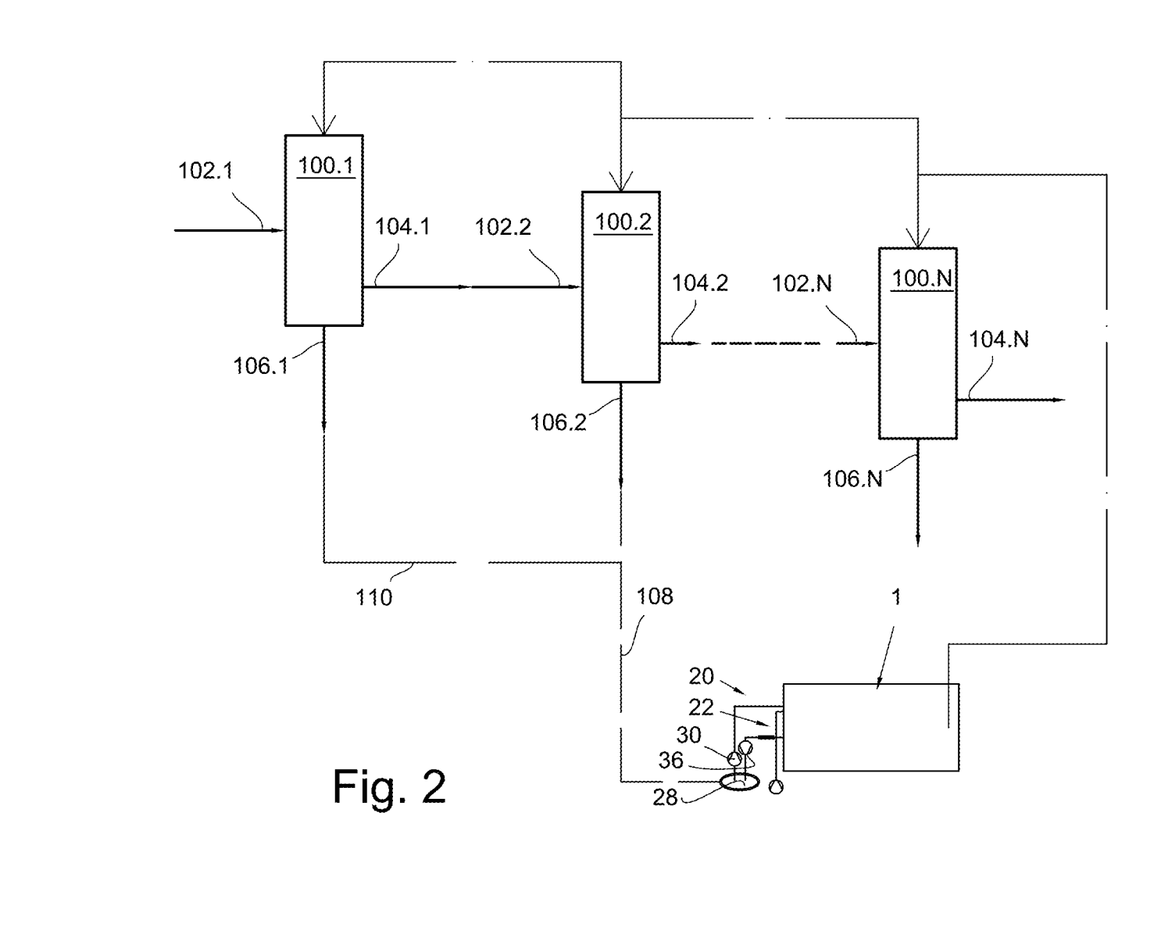
FIG. 2 illustrates a raw gas processing plant which is provided with an internal combustion engine shown in FIG. 1

FIG. 2 depicts a raw gas processing plant which is provided with an internal combustion engine 1 according to the present invention. The raw gas processing plant may be for example a natural gas processing plant or a raw gas processing plant e.g. at a well area. According to an embodiment the processing plant comprises one or more separate processing units 100.1-100.N where the raw gas is handled. Each unit is provided with inlet connection 102.1, 102.2, 102.N, accept outlet 104.1, 104.2, 104.N and a reject outlet 106.1, 106.2, 106.N. The accept outlet 104.1 of the first unit 100.1 is here connected to the inlet connection 102.2 of the second unit 100.2 and the accept outlet 104.2 of the second processing unit 100.2 is connected to an inlet connection of a next processing unit, finally to the inlet 102.N of the last processing unit 100.N. As is depicted in FIG. 2 the second processing unit 100.2 has its reject outlet in connection with the fuel tank 28 of the first fuel section 20 of the engine 1 which is illustrated by the reference 108. In this case the gas processing plant is arranged such that the second processing unit reject outlet produces liquid condensate gas which is led for combustion in the engine 1 after optional processing steps which are not shown here. It is possible, depending on the actual process, that more than one processing units are such that the reject outlet may be in connection with the fuel tank 28 illustrated by the reference 110. The raw processing 100.1-100.N results in a separation of accept flow and liquid reject flow, and in the method according to the invention at least a fraction of the liquid reject flow is used as the low viscosity fuel in the operating an internal combustion engine described in connection with the FIG. 1.

The engine 1 is, according to an embodiment, provided with an electric generator (not shown) which is arranged to provide power at the site, advantageously for purposes of the processing units, as is depicted by the reference 112.

Particularly so called lease condensates are the first round separation of the liquids at the well area either from raw oil or raw gas. Amount and composition is site specific. Additional condensates sources are side streams in LNG production, NG processing and LPG production, field facilities at well (lease condensate), field processing (NG, LPG, NGL, Natural Gasoline), refinery (condensates from CRO, light naphtha, heavy naphtha), LNG liquefaction (side streams).

Figure 3:
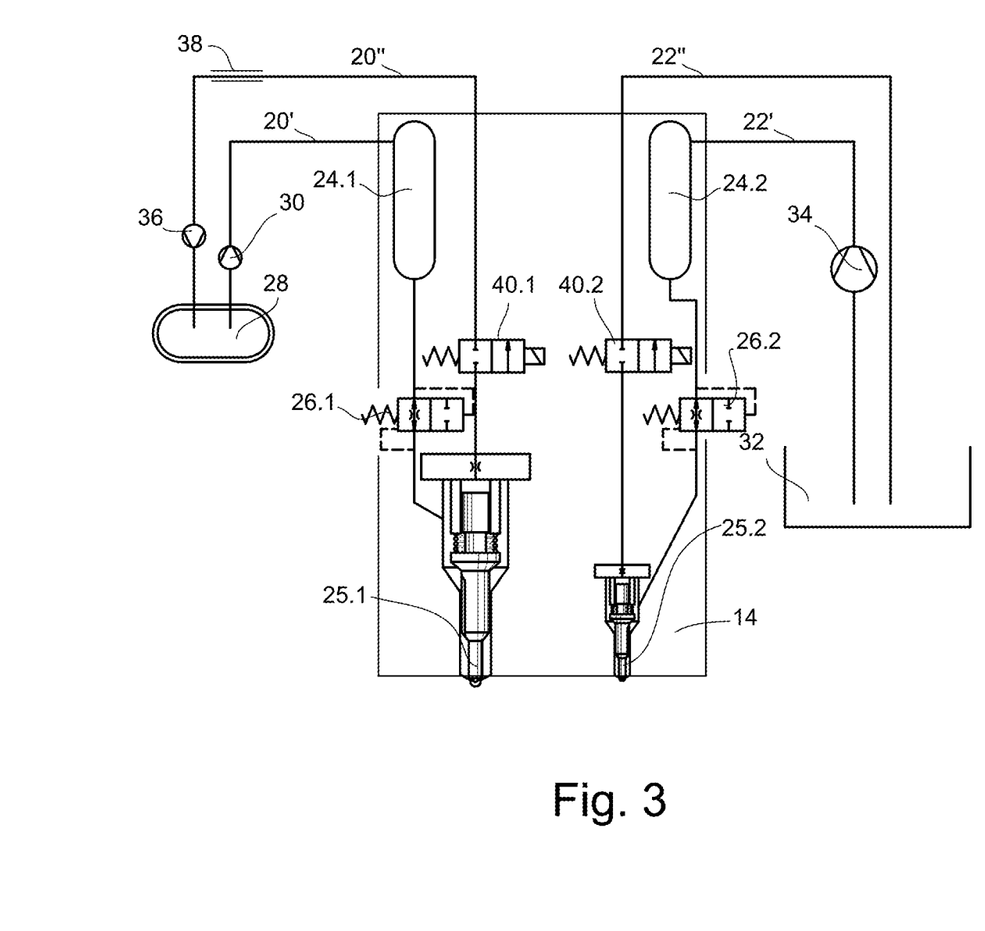
FIG. 3 illustrates an embodiment of the injector assembly shown in FIG. 1 in more detailed manner.

In FIG. 3 there is shown an injector assembly 14 of the FIG. 1 described in a more detailed manner. The assembly 14 is shared by the first and the second fuel sections 20, 22. The injector assembly is provided with fluidly separated flow channels and equipment, such as injectors 25.1, 25.2 and control solenoids 40.1, 40.2 for the first and the second fuel sections. With the term fluidly separated it is meant that the sections are separated from each other so that possibly only leakage fuels may be mixed with each other, which leakage fuels may be handled as combined flow but separately from the first fuel section and the second fuel section. In other words the control of the operation of the first injector 24.1 is independent from the control of the operation of the second injector 24.2, in vice versa. Additionally, because of being fluidly separated from each other, e.g. the fuel pressure levels, so called rate shapes and injection amounts may be independently selected. The injector assembly 14 is provided according to an invention with a dedicated pressure accumulator 24.1 and a flow fuse 26.1 for the first injector 25.1 in connection with the first fuel section 20. Since the first fuel section is used to feed the main fuel into the engine the accumulator 24.1 is this way positioned near the nozzle opening. Here the pressure accumulator 24.1 of the first fuel section 20 is integrated into the injector assembly 14. In the embodiment of FIG. 3 also the second fuel section 22 in this embodiment comprises a dedicated pressure accumulator 24.2 and a flow fuse 26.2 in connection with the injector assembly 14, also integrated in the injector assembly 14.

The injectors 25.1, 26.1 are arranged controllable by making use of the fuel in the control procedure. Each of the first control solenoids 40.1 of the first fuel section 20 is arranged to operate the first injector 24.1 by making use of the pressure of the first fuel. Respectively, each of the second control solenoids 40.2 of the second fuel section 22 is arranged to operate the second injector 24.2 by making use of the pressure of the second fuel. This way the injectors of the first fuel section 20 are provided with dedicated first fuel pressure operated control equipment, and the injectors of the first fuel section 22 are provided with dedicated second fuel pressure operated control equipment. More particularly the pressure of the fuel is used to control the position of the injectors 25.1, 25.2 by means of a solenoid valve 40.1, 40.2 which selectively opens a connection to the return line 20", 22" at lower pressure than in the inlet line. The opening of the injector takes place by opening the connection to the return line. When it comes to the first fuel section 20 the fuel portion used in controlling the injector 25.1 is led to a return line 20" of the fuel section 20. The return line 20" extends from each injector 25.1 to the tank 28. And the return line is provided with a pressure increasing means 36 and optionally a heat transfer means 38 as is explained in connection with FIG. 1. In this exemplary embodiment the first fuel section 20 and the second fuel section 22 share a common fuel injector assembly 14. However, the injector assembly is provided with fluidly separated flow channels and equipment, such as injectors 25.1, 25.2 for the first and the second fuel sections. Instead of the description of the FIG. 3 the second fuel section accumulator 24.2 may be integrated at least partially into the inlet line 22'.

Figure 4:
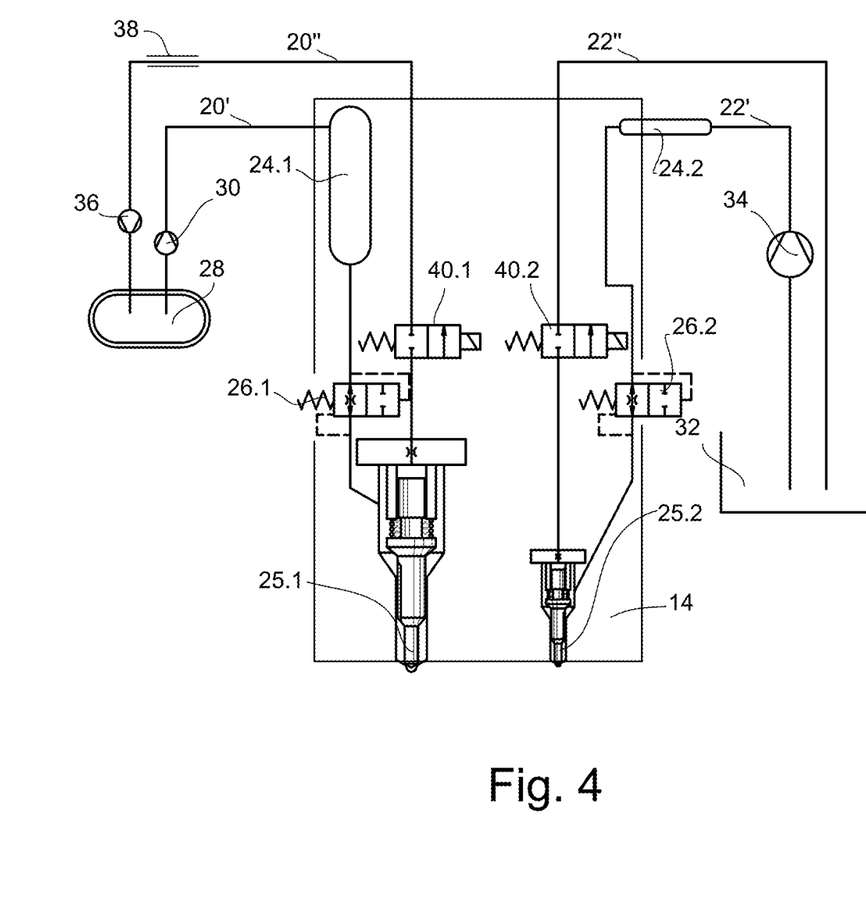
FIG. 4 illustrates another embodiment of the injector assembly shown in FIG. 1.

FIG. 4 discloses another embodiment of the injector assembly 14 of the FIG. 1 described in a more detailed manner. The assembly is shared by the first and the second fuel sections 20, 22. The disclosure relating to the FIG. 3 applies also to the embodiment of FIG. 4 except that here the accumulator 24.2 of the second fuel section is at least partially outside the injector assembly, arranged into the inlet line 22'. In other words the accumulator 24.2 uses the volume of the inlet line 22', which may have a section provided with cross sectional extension arranged for this purpose. This makes it possible that more space in the assembly 14 may be reserved for the accumulator 24.1 of the first fuel section 20.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A fuel system for an internal combustion piston engine comprising:
    a first fuel section and a second fuel section in which the first fuel section comprises a first inlet line connecting respective inlets of first injectors to a tank, and the second fuel section comprises a second inlet line connecting respective inlets of second injectors to a fuel tank,
    the second fuel section being arranged to inject a second fuel into the combustion chambers for igniting a first fuel, the inlet line extending in the first fuel section from a high pressure pump to the respective injectors, and a first fuel return line of the first fuel section extending from each of the first injectors to the tank, and
    the first fuel return line comprising a pressure increaser arranged to the first fuel return line of the first fuel section between the injectors and the tank.

2. A fuel system for an internal combustion engine according to claim 1, wherein the pressure increaser is arranged to maintain a desired fuel pressure in the tank of the first fuel section and the fuel system comprises with a control system adapted to control the operation of the pressure increasing means.

3. A fuel system for an internal combustion engine according to claim 1, wherein the fuel return line comprises a heat transfer means arranged between the injectors and the tank and the fuel system comprises a control system adapted to control the operation of the heat transfer means.

4. A fuel system for an internal combustion engine according to claim 1, wherein the pressure increaser is arranged to maintain a desired fuel pressure in the tank of the first fuel section, and that the fuel return line comprises a heat transfer means arranged between the injectors and the tank and the fuel system is provided with a control system adapted to control the operation of the heat transfer means, and the operation of the pressure and the heat transfer means.

5. A fuel system for an internal combustion engine according to claim 1, wherein the first fuel section and the second fuel section share a common fuel injector assembly with fluidly separated flow channels and equipment for the first and the second fuel sections.

6. A fuel system for an internal combustion engine according to claim 5, wherein the injectors of the first fuel system are provided with dedicated first fuel pressure operated control equipment, and the injectors of the first fuel system are provided with dedicated second fuel pressure operated control equipment.

7. A fuel system for an internal combustion engine according to claim 5, wherein the injector assembly is provided with a dedicated pressure accumulator and a flow fuse for the first injector.

8. A fuel system for an internal combustion engine according to claim 7, wherein the accumulator of the second fuel section is at least partially outside the injector assembly using the volume of the inlet line having a section provided with cross sectional extension.

9. A method of operating an internal combustion engine provided with a first fuel section via which a first fuel is fed to the engine in liquid form and a second fuel system via which a second fuel is fed to the engine in liquid form, the engine is operated by feeding low viscosity fuel in liquid phase as the first fuel via a first fuel injector of the first fuel section directly to a combustion chamber of the engine and where the low viscosity fuel is ignited by injecting the second fuel as a pilot fuel into the combustion chamber by means of a second fuel injector of the second fuel section, wherein a part of the first low viscosity fuel is returned back to a tank of the first fuel section and the pressure of the returned part of the low viscosity fuel is increased prior to its introduction into a fuel tank, the first fuel having its viscosity $0.1\text{-}1\times10^{-6}$ m$^2$/s.

10. The system of claim 3 wherein said heat transfer means comprises a cooler.

11. A method of operating an internal combustion engine according to claim 9, wherein the low viscosity fuel comprises a gas condensate fuel consisting of hydrocarbon with $\geq 3$ carbon atoms in the chain and the method is practised for combusting the gas condensate fuel.

12. A Method of operating an internal combustion engine according to claim 9, wherein the part of the low viscosity fuel is returned back to a tank of the first fuel section and heat is transferred into/from the returned part of the low viscosity fuel prior to its introduction into a fuel tank of the first fuel section.

13. A method of operating an internal combustion engine according to claim 9, wherein the part of the low viscosity fuel is returned back to a tank of the first fuel section and the returned part of the low viscosity fuel is cooled prior to its introduction into a fuel tank of the first fuel section and the pressure of the returned part of the low viscosity fuel is increased prior to its introduction into a fuel tank of the first fuel section.

14. A method of operating an internal combustion engine according to claim 9, wherein the returned part of the low viscosity fuel is cooled prior to increasing its pressure.

15. A method of processing raw gas comprising one or more steps of processing the raw gas resulting a separation of accept flow and liquid reject flow, in which method at least a fraction of the liquid reject flow is used as the low viscosity fuel in the method according to claim 9.

16. A fuel system for an internal combustion piston engine comprising:
    a first fuel section and a second fuel section in which the first fuel section comprises a first inlet line connecting respective inlets of first injectors to a tank, and the second fuel section comprises a second inlet line connecting respective inlets of second injectors to a fuel tank,
    the second fuel section being arranged to inject a second fuel into the combustion chambers for igniting a first fuel, the inlet line extending in the first fuel section from a high pressure pump to the respective injectors, and a first fuel return line of the first fuel section extending from each of the first injectors tank, and
    the first fuel return line comprising a pressure increasing means arranged to the first fuel return line of the first fuel section between the injectors and the tank.

* * * * *

UNITED STATES PATENT AND TRADEMARK OFFICE
CERTIFICATE OF CORRECTION

PATENT NO. : 9,777,690 B2  
APPLICATION NO. : 14/824530  
DATED : October 3, 2017  
INVENTOR(S) : David C. Jay and Timo Kortet Page 1 of 1

It is certified that error appears in the above-identified patent and that said Letters Patent is hereby corrected as shown below:

On the Title Page

In the Applicant (71): Delete "Vassa" and insert --Vaasa--

In the Inventors (72): Delete "Vassa" and insert --Vaasa--

In the Claims

Column 9, Line 3, Claim 4: Delete "pressure and" and insert --pressure increaser and--

Signed and Sealed this  
Twenty-eighth Day of November, 2017

Joseph Matal  
*Performing the Functions and Duties of the*  
*Under Secretary of Commerce for Intellectual Property and*  
*Director of the United States Patent and Trademark Office*